(No Model.) 7 Sheets—Sheet 1.

W. S. JARBOE.
TIME STAMP.

No. 543,248. Patented July 23, 1895.

WITNESSES:
W H Pumphrey
B. F. Thornett

INVENTOR
Walter S. Jarboe
BY
Evert & Appleman
ATTORNEYS (No Model.) 7 Sheets—Sheet 2.

W. S. JARBOE.
TIME STAMP.

No. 543,248. Patented July 23, 1895.

Witnesses
Jas. L. Bowen
W. H. Pumphrey

Inventor
Walter S Jarboe
by Evert Appleman
Attorneys (No Model.) 7 Sheets—Sheet 3.

W. S. JARBOE.
TIME STAMP.

No. 543,248. Patented July 23, 1895.

WITNESSES:

INVENTOR
Walter S. Jarboe
BY
Evert & Appleman
ATTORNEYS (No Model.) 7 Sheets—Sheet 4.

W. S. JARBOE.
TIME STAMP.

No. 543,248. Patented July 23, 1895.

(No Model.) 7 Sheets—Sheet 6.

W. S. JARBOE.
TIME STAMP.

No. 543,248. Patented July 23, 1895.

WITNESSES:
W. H. Pumphrey.
B. F. Thornett.

INVENTOR
Walter S. Jarboe
BY Evert & Appleman
ATTORNEYS

UNITED STATES PATENT OFFICE.

WALTER S. JARBOE, OF PITTSBURG, PENNSYLVANIA, ASSIGNOR TO THE TIME TRANSFER PRINTER MANUFACTURING COMPANY, OF CHICAGO, ILLINOIS.

TIME-STAMP.

SPECIFICATION forming part of Letters Patent No. 543,248, dated July 23, 1895.

Application filed July 24, 1893. Serial No. 481,310. (No model.)

*To all whom it may concern:*

Be it known that I, WALTER S. JARBOE, a citizen of the United States of America, residing at Pittsburg, in the county of Allegheny and State of Pennsylvania, have invented certain new and useful Improvements in Time-Stamps, of which the following is a specification, reference being had to the accompanying drawings.

This invention relates to time-stamps.

The object of the invention is to construct a machine of the above-referred-to class that will, upon each rotation of the printing mechanism, print a time-scale on each ticket or check, and novel means for partially or wholly separating the scale and tickets in a manner to indicate the time of issue; furthermore, the said time-scale to operate in conjunction with a clock mechanism to automatically change the time.

The invention further contemplates to employ eccentric and concentric type-carriers and novel means to adjust the type-carriers independently, in order to change the characters printed on the tickets—such as, for example, the day, month, year, or other characters.

A still further object of the invention is to employ inking and driving mechanism in combination with a printing-cylinder and time-wheel, to print a ticket on every revolution of the cylinder from a continuous paper roll, and means for partially or wholly separating said tickets.

The invention is illustrated in the accompanying drawings, forming part of this specification, and in which like letters of reference indicate corresponding parts.

Fig. 1ª is a view in central vertical longitudinal section of the machine, showing the casing inclosing the mechanism, the hollow spindle fixed by being held in a threaded socket in the front plate of the casing, the eccentric sleeve rotatably mounted on the spindle, the concentric and eccentric type-carriers forming the printing-cylinder and the adjusting-levers for the carriers, the stop-plate for limiting the throw of the levers, the time-ring, the time-movement, and the hour and minute spindles projecting through the hollow spindle and having hands or pointers traveling over the dial in the front plate, the yielding connection between the hour-spindle and the time-wheel, the gear upon which the time-movement is mounted and the support for the gear, the impression-roller provided at its ends with an intermeshing gear, and the paper roll. Fig. 3 is a view in plan, the hinged portion of the casing being removed. Fig. 6 is a view showing one form of printed ticket and the manner of representing and indicating the time of issue thereof.

In the drawings, A represents the casing; B, the time-movement; C, the type-cylinder; D, the ink-roller; E, the impression-roller; F, the paper roll; G, the cutter, and H the operating-crank, which is detachably fixed in any suitable manner on the outer projecting end of the impression-roller shaft, and by which motion is imparted to the several rollers through suitable gearing.

The casing comprises front and back plates $A'$ $A^2$, flanged at $A^3$ and connected by bolts $A^4$, which serve also as supports for plates $A^5$ $A^6$, the plate $A^5$ being an ink-guard to protect the paper from contact with the ink-roller and the plate $A^6$ acting as a guide to direct the paper to the discharge-opening $A^7$ in the side of the casing. Detachably secured to the flanges of these plates by screws are sides $A^8$, the sides being formed of sections hinged together, as at $A^9$. The upper hinged section $A^{10}$, slotted at $A^{11}$, is provided with an apertured projection $A^{12}$, and the lower hinged section $A^{13}$ is similarly provided with projections $A^{14}$, which when the casing is closed become aligned with those of the upper section to receive a locking-rod $A^{16}$, the rod being also passed through openings $A^{15}$ in the front and back plates to prevent access to the interior of the casing.

In the rear plate is a flanged opening $A^{17}$, having an apertured projection depending from the top thereof. A cap $A^{22}$, encircling the flange $A^{21}$ of the opening, is detachably held by bayonet-joints $A^{23}$ and designed to protect by completely inclosing the time-movement, the cap being provided with apertured projection $A^{24}$, which when the cap is in position extends under the apertured head $A^{25}$ of the locking-rod, the apertures coinciding to receive any suitable lock.

Referring to Figs. 7 to 20, wherein the type-cylinder is shown both assembled and in detail, $c^2$ represents a hollow spindle secured to the front plate of the casing by having one of its ends held in a threaded socket and upon which an eccentric sleeve $c^3$ is rotatably mounted. This sleeve is differentially formed on its outer surface, its length being divided into terminal concentric and eccentric portions $c^4$ $c^6$ and an intermediate eccentric portion $c^5$. On the concentric portion $c^4$ any desired heading or matter requiring continuous engagement with the impression-roller is placed—such as, for example, "Pittsburg & Duquesne Traction Co. Good from junction only 10 minutes after issue. Car, this day and date, 48."

Mounted upon the intermediate eccentric portion of the sleeve are the type carriers or rings $c^7$ and levers $c^8$, by which the carriers may be adjusted, the rings being designed in the present embodiment of the invention to carry names, dates, &c. Equispaced on the inner circumference of each ring are notches $c^9$, which correspond in number and are readily aligned with the names, dates, &c., as are also a second series of notches $c^{10}$ formed in the side face of the ring. The notches $c^9$, receive spring-pawls $c^{12}$, which are seated in a groove or recess $c^{11}$ formed in the eccentric portion $c^5$ of the sleeve, the notches and pawls being beveled to permit rotation of the rings upon the sleeve in but one direction, in which they are adjustable, and serving also to lock the rings, whereby they move with the spindle when it is rotated. The adjustment of the rings is effected by means of beveled spring-pawls $c^{13}$, which are seated in and project from recesses in the levers $c^8$ to engage the beveled notches $c^{10}$ of the rings, the levers being provided with a ring-like extension by which they are mounted on the sleeve. To secure a proper adjustment of the rings, the movement of the levers is limited by stops, preferably by the slotted plate $c'''$, fixed to the side of the casing, the length of the slots varying according to the number of characters on the corresponding ring, thereby insuring a proper presentation of such characters in sequence as the lever is operated.

To prevent fraud it is desirable that certain of the type-rings be protected from unauthorized manipulation, which is readily effected by shortening them, the remaining levers projecting through slots in the casing, as shown. In the eccentric portion of the sleeve a groove $c''''$ is formed and seated therein is a locking-yoke $c'''''$, which serves to retain the type-rings upon the sleeve by being secured to the adjoining adjusting-lever.

The device for recording the time of issue upon each impression from the printing-cylinder comprises a time-wheel, a time-movement, and a cutter.

Figures 1, 5:
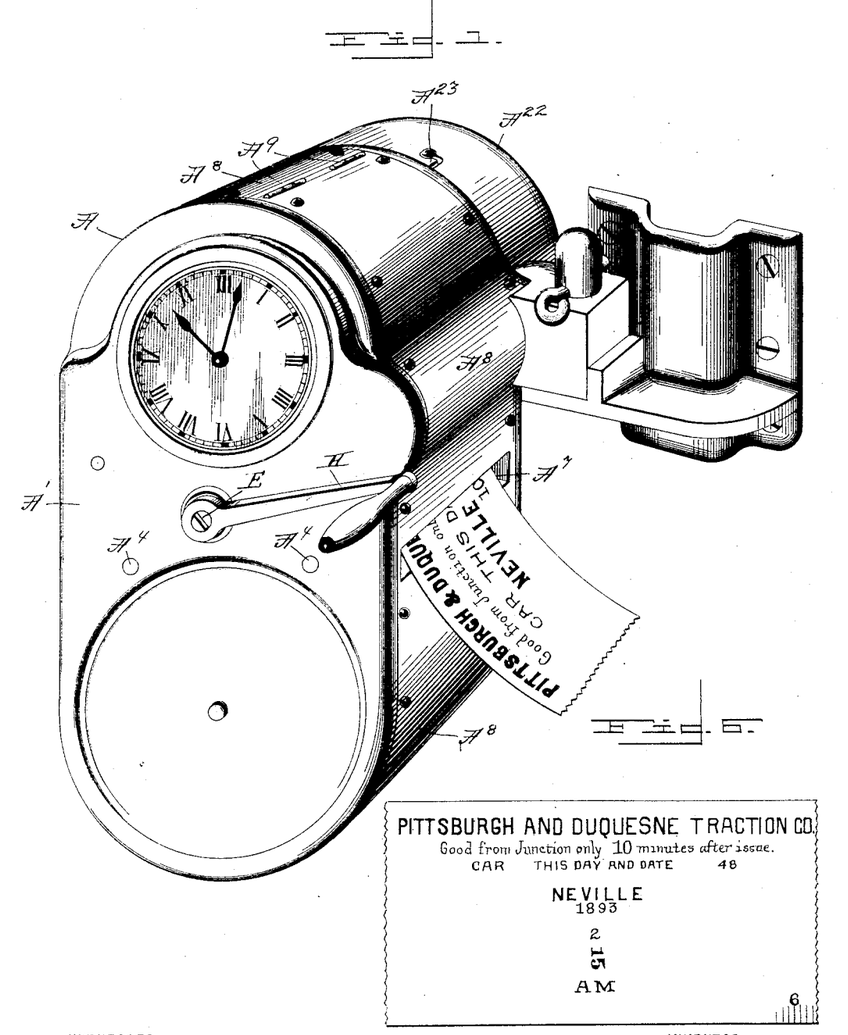
Figure 1 is a view in perspective showing a casing in which the mechanism is inclosed, provided with an apertured offset and a supporting-bracket, having a vertical stud entering the aperture of the offset, a dial in the front plate of the casing, the hour and minute hands, and a crank by which the mechanism is designed to be operated.
Fig. 5 is a view in diagram, on an enlarged scale, showing the arrangement of the rollers, the course of the paper through the machine being also indicated.
Figure 2:
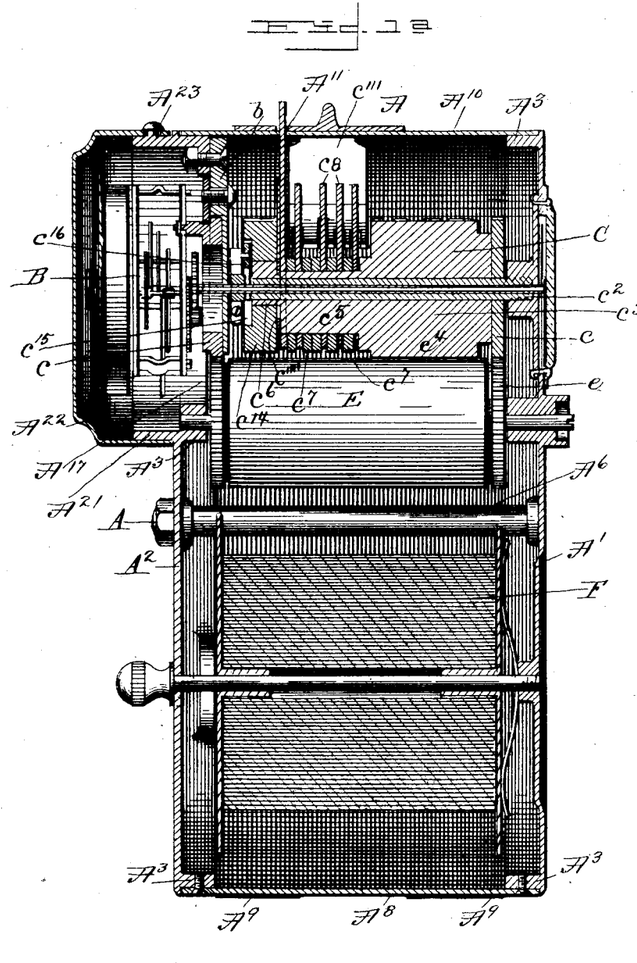
Fig. 2 is a view in perspective, portions of the casing joining the front and back plates being hinged and swung open to illustrate more clearly the relative arrangement of the parts.
Figures 4, 5:
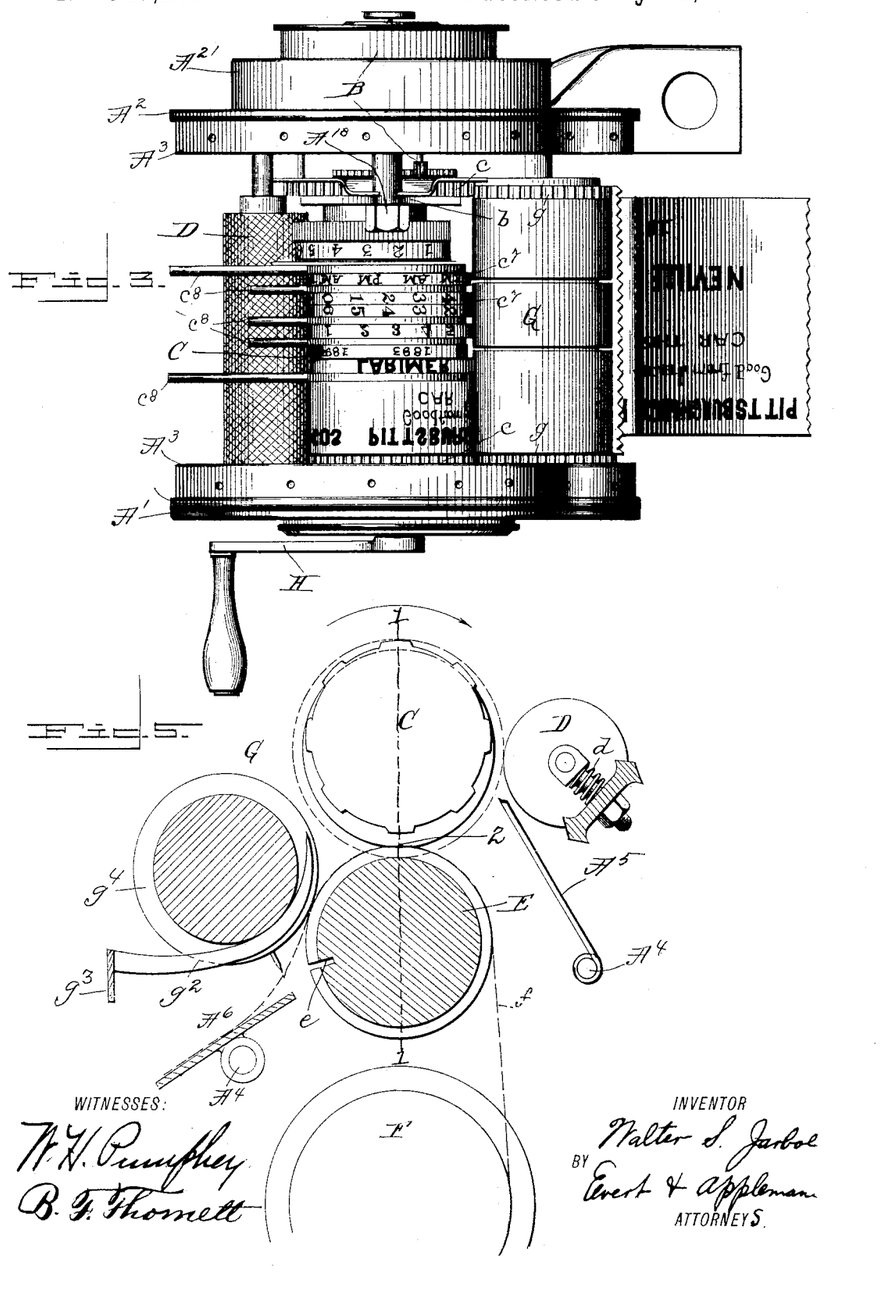
Fig. 4 is a view in elevation with the front plate removed to show the gearing through which motion is transmitted to the rollers.
Figure 7:
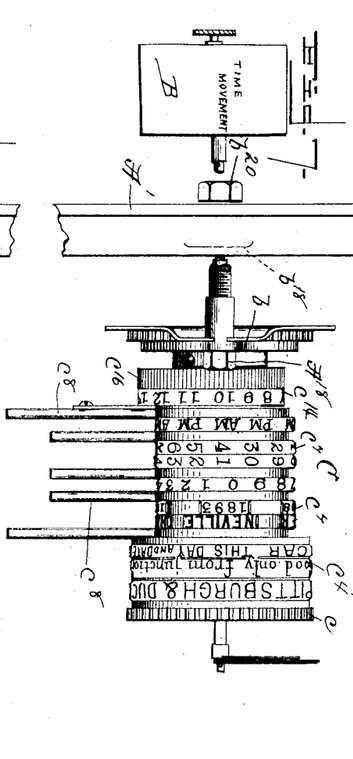
Fig. 7 is a view in plan of the printing-cylinder, showing the time and type rings assembled upon the eccentric sleeve, the time-movement disconnected and located adjacent to the cylinder, the gear upon which the time-movement is designed to be mounted, the support for the gear, a portion of the flanged rear plate of the casing, and the bolt and nut by which the support is secured thereto.
Figure 8:
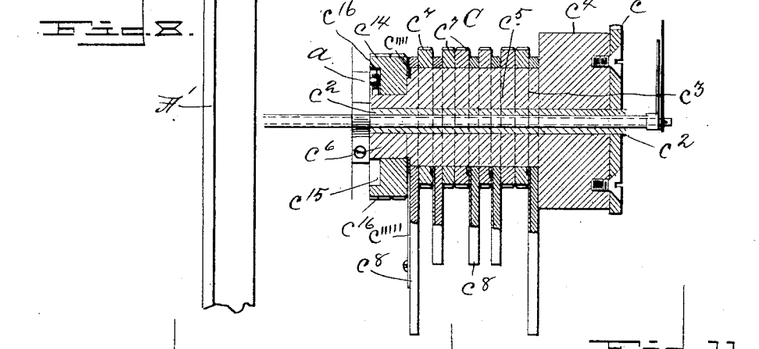
Fig. 8 is a view in central horizontal section of the same.
Figure 9:
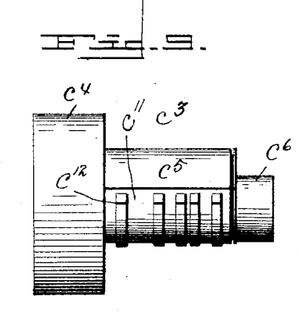
Fig. 9 is a view in plan of the eccentric sleeve, on which the type-carriers are mounted.
Figure 10:
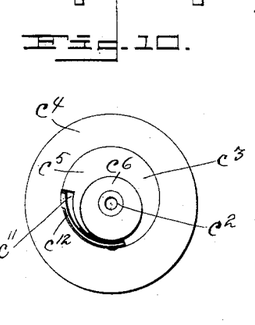
Fig. 10 is a view in elevation of the end of the same.
Figure 11:
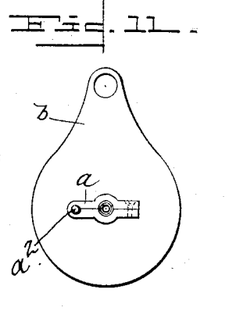
Fig. 11 is a view in front elevation of the gear-carrying support, showing the minute and hour spindles projecting through an opening therein, and a crank-arm detachably secured on the hour-spindle, by which motion is transmitted to the time-wheel.
Figures 12, 13, 14, 15, 16, 17, 18, 19:
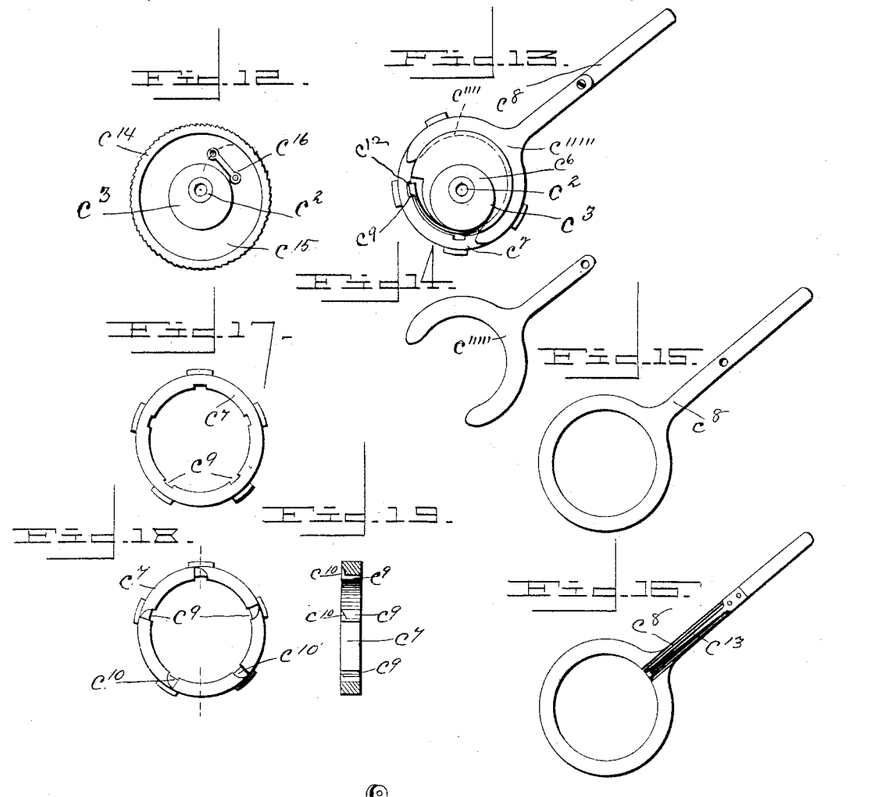
Fig. 12 is a view in elevation of the time-wheel, shown as mounted eccentrically, and having a link pivoted in an annular groove or depression in its face, by which it is connected with to receive motion from the crank-arm on the hour-spindle.
Fig. 13 is a view in elevation showing the locking-yoke applied, the yoke being designed to enter a circumferential groove in the eccentric sleeve, and thereby retain the several type-carriers in proper relative position.
Fig. 14 is a view in detail of the yoke detached.
Figs. 15 and 16 are detail views in elevation of the adjusting-levers for the type-carriers, showing opposite sides thereof, and the spring-dogs for engaging notches of the carriers.
Figs. 17 and 18 are similar views showing opposite sides of the carriers and the notches formed therein.
Fig. 19 is a view in central section of one of the carriers, showing the inner circumferential notches.
Figures 20, 21, 22:
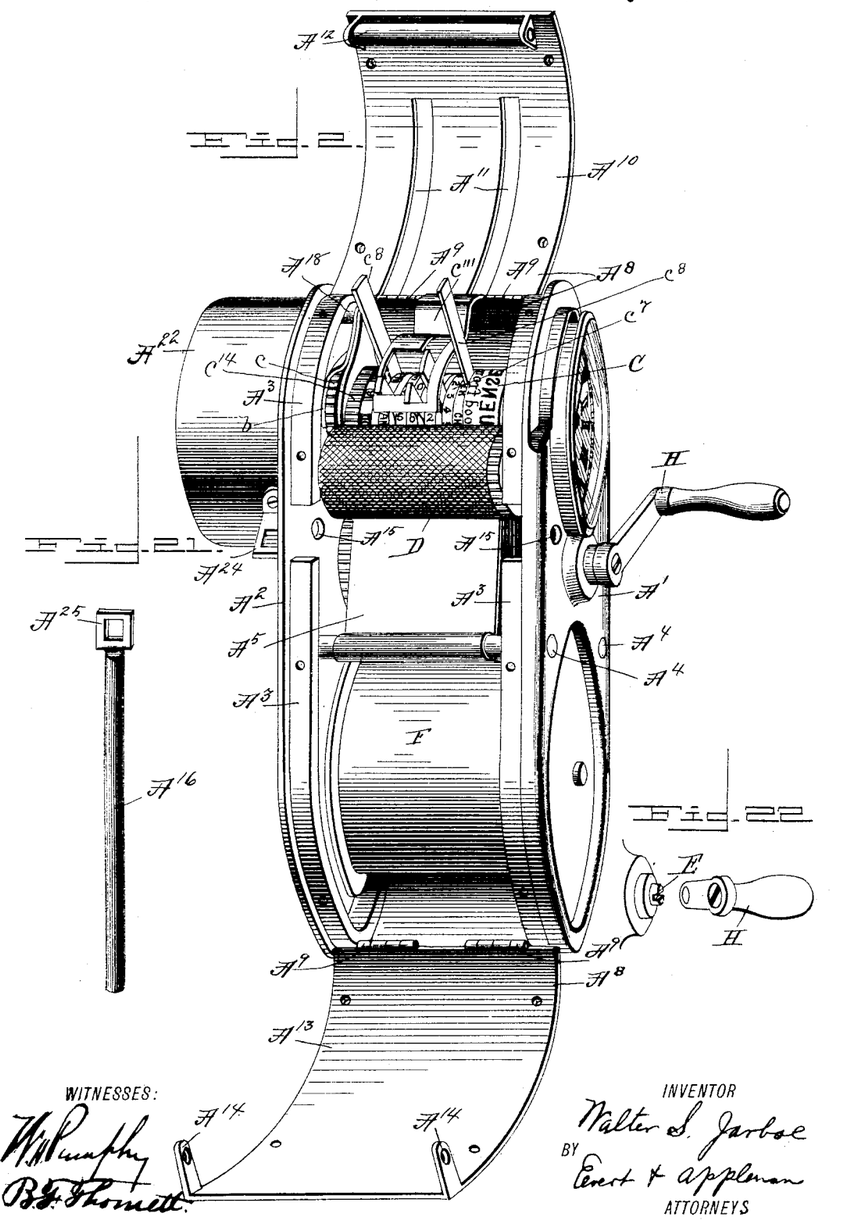
Fig. 20 is a detail view in perspective showing the hollow spindle, the eccentric sleeve thereon having a longitudinally-extending groove or recess, spring-dogs held in the groove and normally engaging the inner circumferential notches of the type-carriers on the sleeve, and the adjusting-lever and its spring-dog also normally engaging the notches in the face of the carrier.
Fig. 21 is a detail view in perspective of the locking-rod, showing its flattened apertured head.
Fig. 22 is a detail view in perspective, showing the detachable connection between the main shaft and the operating-crank.
Figure 20:
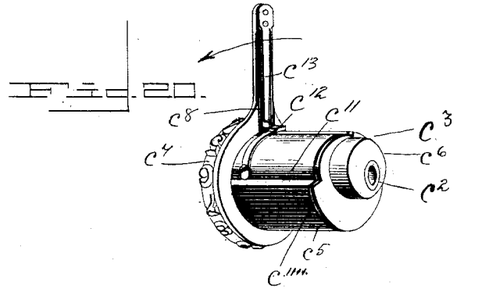

The time-wheel $c^{14}$ is rotatably mounted upon the terminal eccentric $c^6$ of the sleeve, and pivoted in a groove $c^{15}$ in one side thereof is a link $c^{16}$, through which the wheel is connected with a crank-arm on the hour spindle of the time-movement, the link being employed to compensate for the eccentricity of the mounting, which is effected by the link turning freely about its pivot-pins upon the crank and wheel, whereby it affords a yielding connection, in that it is self-adjusting to the eccentric throw of the time-wheel. The peripheral face of the wheel is of a form suitable for stamping a time, scale—such as, for example, that indicated in the drawings—and by reason of the peculiar mounting and impression from the wheel will represent only that portion of the scale indicating the proper hour.

Bolted to the projection depending from the top of opening $A^{17}$ in the rear plate is a gear-carrying support $b$ in the form of a cylindrical casing, flanged at its ends, the gear $c$ being held thereby in a manner free to rotate and having projecting studs on its face, entering and secured in apertures in the frame of the time-movement, whereby the movement is carried by the gear and partakes of motion imparted to it through a train of intermeshing gears on the adjoining ends of the rollers.

Immediately under the printing-cylinder the impression-roller is journaled and suitably surfaced to serve as a platen. Lengthwise of this roller is a groove or depression to receive the cutting or perforating blades of the roller G, which is so regulated by gearing as to partially or wholly divide the scale recorded at a point indicating the exact time of issue.

To facilitate the discharge of the paper strippers $g^2$ are employed. These strippers are mounted on a bar $g^3$ and enter annular grooves $g^4$ in the cutter-roller, by which paper from the printing-cylinder is kept clear and freely shed from the cutter.

The inking-roller D is preferably mounted in yielding bearings $d$ to allow free rotation of the printing-cylinder.

Figure 23:
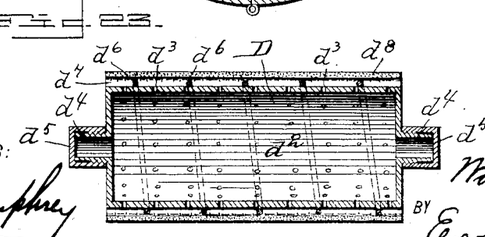
Fig. 23 is a view in central vertical longitudinal section of the inking-roller.
Figures 24, 25:
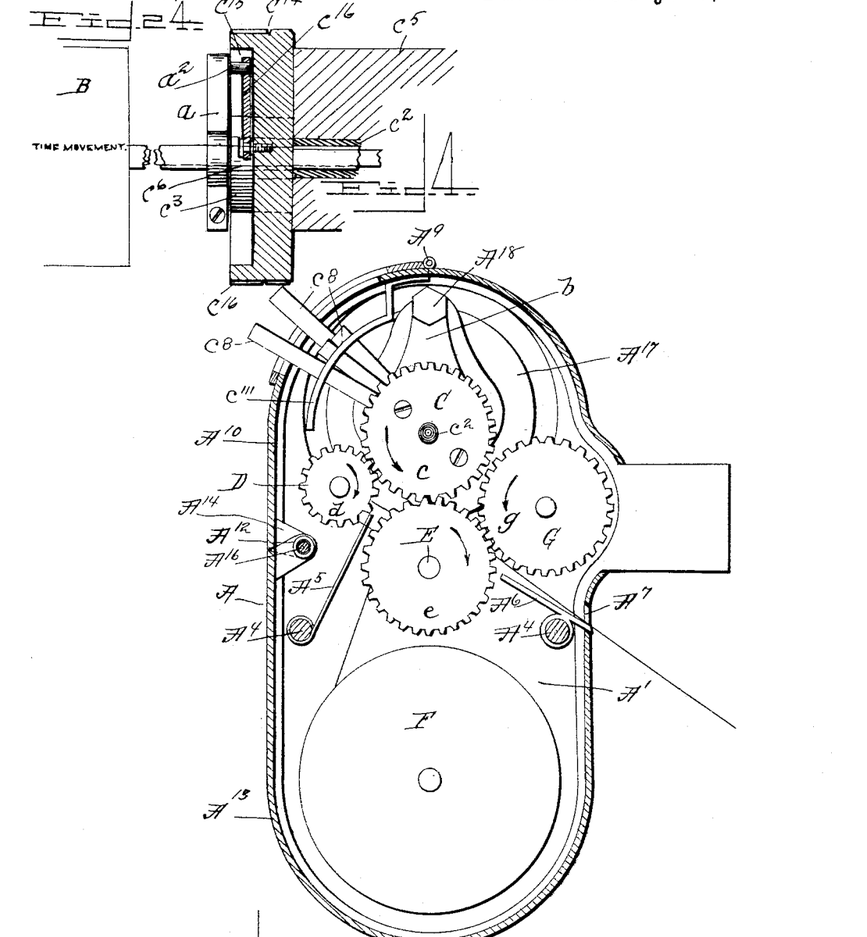
Fig. 24 is a detail view in horizontal section, showing the link connection between the time-movement and time-wheel.

Referring to Fig. 23 of the drawings, $d^2$ represents the ink-tube proper, having perforations $d^3$ and threaded at the ends $d^4$ to receive caps $d^5$. Wound spirally around the tube is a wire $d^6$, which serves to form channels by separating the tube from the gauze covering $d^7$, over which one or more layers of felt are secured.

In the use of the machine the paper or other suitable material from the roll is passed between the printing-cylinder and the impression-roller, the ink guard-plate serving as a fender or guide to protect the paper from contact with the ink-roller. On rotating the crank motion will be imparted to the roller and cylinder through the gears $c\ e\ g$, and by reason of the continuous contact of the concentric portion of the cylinder with the impression-roller the paper will be automatically fed by being drawn from the roll. As the paper passes from the cylinder the cutter or perforated blade enters the groove in the impression-roller, and partially or wholly severs a determined length from the strip, the point of division being through the time-scale thereon represented and at a point indicating the exact time of issue. After being acted upon by the cutter the paper is directed by the guide-plate and strippers to the opening in the side of the casing, from which it is discharged in the form of a printed ticket.

Having fully described my invention, what I claim as new, and desire to secure by Letters Patent, is—

1. The combination with printing mechanism, of a device for representing a time scale upon each impression from the printing mechanism, and means for partially or wholly separating the scale in a manner to indicate the time of issue.

2. The combination with inking and driving mechanism, of a printing cylinder, comprising concentric and eccentric type-carriers and a continuously rotating time-ring, the carriers and ring being mounted on a common spindle, as specified.

3. A time stamp, comprising a time movement and a time printing wheel, gearing for imparting motion to the movement and wheel whereby they rotate in unison, and a link connection by which continuous and independent motion is transmitted from the movement to the disk.

4. The combination with a concentrically mounted time-movement, of an eccentrically mounted time printing wheel, and a yielding connection between the movement and the wheel, as specified.

5. A stamping device for representing a time scale, and means for partially or wholly separating the scale in a manner to indicate the time of issue, as specified.

6. The combination with inking and driving mechanism, of a printing cylinder, comprising concentric and eccentric type carriers, devices for adjusting the type carriers and a continuously rotating time ring, the carriers and ring being mounted on a common spindle, for the purpose described.

7. A time stamp comprising a time movement, an eccentrically mounted device for representing a time scale, gearing for imparting motion to the time movement and the device for representing the time scale, whereby they rotate in unison, a link connection by which continuous independent motion is transmitted from the movement to the disk, and means for partially or wholly separating the scale, in a manner to indicate the time of issue, as and for the purpose described.

8. The combination with a concentrically mounted time movement, of a printing wheel eccentrically mounted in a manner to represent, when rotated, a time scale, a yielding connection between the movement and the wheel and means for partially or wholly separating the scale, in a manner to indicate the time of issue, as and for the purpose described.

In testimony whereof I affix my signature in presence of two witnesses.

WALTER S. JARBOE.

Witnesses:
  H. C. EVERT,
  H. E. SEIBERT.